Figure 5:
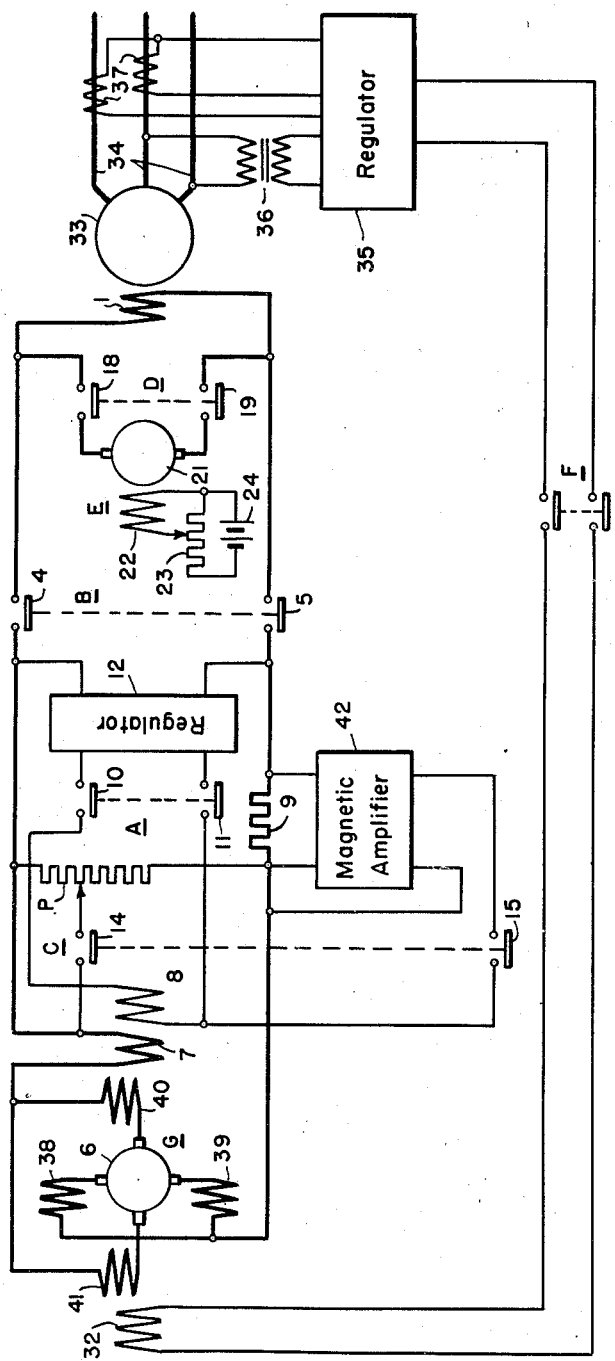

Aug. 26, 1952     D. F. SHANKLE ET AL     2,608,680
ELECTRIC CURRENT GENERATING MEANS
Filed Dec. 12, 1950     2 SHEETS—SHEET 1
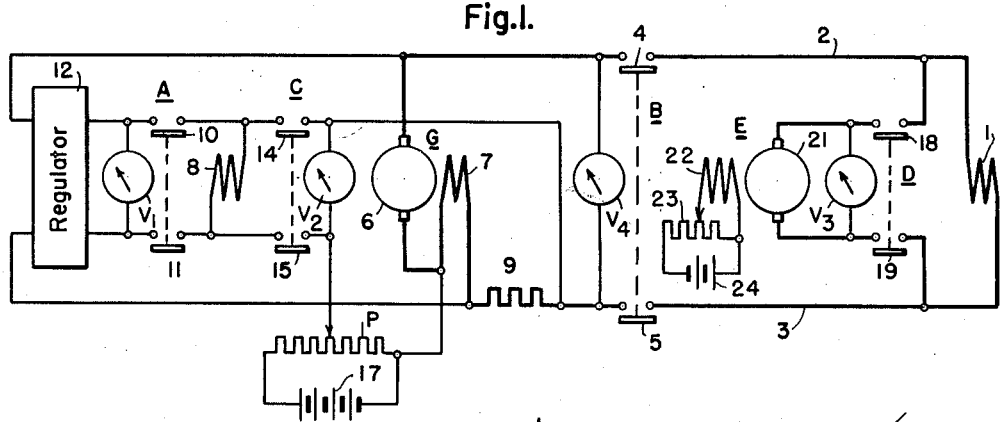
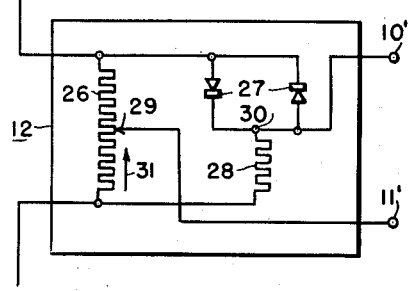
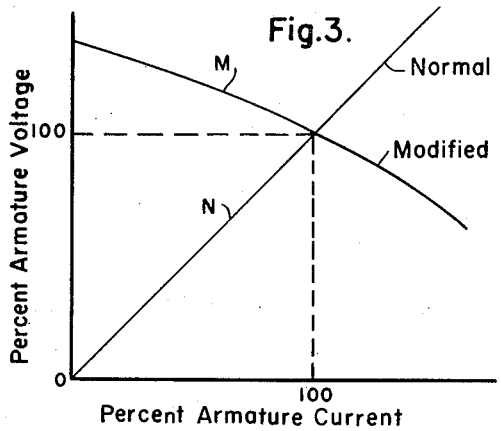
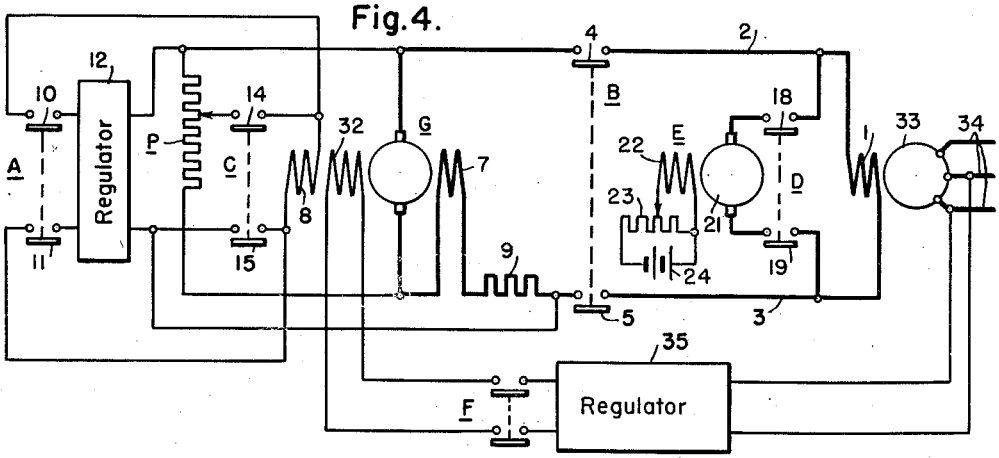
WITNESSES:
E. A. M'Closkey
Leon M. Farman
INVENTORS
John E. Barkle, Jr.,
and Derrill F. Shankle.
BY
Paul E. Friedemann
ATTORNEY Aug. 26, 1952  D. F. SHANKLE ET AL  2,608,680
ELECTRIC CURRENT GENERATING MEANS
Filed Dec. 12, 1950  2 SHEETS—SHEET 2

WITNESSES:
E. A. M°Closkey.
Leon M. Garman

INVENTORS
John E. Barkle, Jr.,
and Derrill F. Shankle
BY Paul E. Friedemann
ATTORNEY Patented Aug. 26, 1952

2,608,680

UNITED STATES PATENT OFFICE 2,608,680

ELECTRIC CURRENT GENERATING MEANS

Derrill F. Shankle and John E. Barkle, Jr., Pittsburgh, Pa., assignors to Westinghouse Electric Corporation, East Pittsburgh, Pa., a corporation of Pennsylvania Application December 12, 1950, Serial No. 200,412

15 Claims. (Cl. 322—27)

Our invention relates to electric current generating means and, more particularly, to control and regulating circuits that involve a series-excited amplifying generator normally operating with a rising external voltage-current characteristic.

It is an object of our invention to provide means for temporarily changing the normally rising voltage-current characteristic of a series-excited generator, such as an amplifying two-stage generator, to any other characteristic, such as a less rising or drooping characteristic, that may be desired for particular operating conditions.

Another object of the invention is to devise means for permitting a parallel operation of such a rising-characteristic generator with one or more shunt-excited or separately-excited generators of a drooping external characteristic, under satisfactory stability conditions and with the possibility of dividing the load between the different machines in any desired manner.

It is also an object of the invention to permit and facilitate a smooth load transfer between a rising-characteristic generator and a drooping-characteristic generator without interruption or appreciable disturbance of the load circuit.

A further object of the invention relating to the mentioned parallel operation or load transfer, is to minimize or prevent unstable motoring of either generator as well as hunting tendencies between the different type generators while these generators are operating in parallel.

Another more specific object of our invention will appear from the following: The so-called "amplifying generators" are increasingly used for providing a controlled or regulated output voltage under control by minute intelligence or error voltages. These amplifying generators operate along the substantially linear, unsaturated portions of their magnetic characteristic and, as a rule, have the rising external voltage-current characteristic of a series type generator. Double-stage or multi-stage designs of such amplifying generators are applicable, for instance, as the main exciter for power-current alternators while being controllable by very small intelligence voltages so that the use of another generator in the excitation system is not required. This advantage of providing within one amplifying generator all the electrodynamic amplification needed between the error responsive intelligence voltage and the alternator field circuit is afforded especially by double-stage and multi-stage machines of the kind known from Patent 2,484,835 of A. W. Kimball and W. R. Harding, Patent 2,484,840 of M. Liwschitz and A. W. Kimball, and Patent 2,445,788 of B. Litman, all assigned to the assignee of the present invention. Due to the rising characteristic of such machines as heretofore known, they do not permit a stable parallel operation with conventional shunt or separately excited generators. The need for paralleling arises, for instance, when the normally active amplifying generator is to be taken out of service and to be temporarily replaced by a conventional, drooping-characteristic exciter. Heretofore, it has been necessary in such cases to first remove the amplifying generator from service by unloading it and then bringing the spare exciter in by the usual starting-up procedure. Although this method may be carried out by automatic quick transfer devices, it remains objectionable because of the system disturbance caused when the alternator field circuit is opened. One of the more specific aims of our invention, therefore, is to make possible a generator paralleling and transfer method applicable for the just-mentioned purpose that avoids an interruption or disturbance of the load circuit and secures a stable operation of the generators being paralleled.

To achieve the above-mentioned objects and in accordance with a feature of our invention, an amplifying series-excited generator of normally rising external voltage-current characteristic has a selectively operable regulating field winding which, when effective, opposes the normal series excitation and modifies the external characteristic to a desired other shape, for instance, to a drooping characteristic. This regulating field winding, when thus effective, has its circuit impressed by voltage derived from, or dependent upon, the current in the generator load circuit and also impressed by another, adjustable voltage so that the modified characteristic depends upon the values and ratio of these two voltages. The adjustable voltage is supplied either from a separate voltage source, such as a small exciter or a battery or a rectifier circuit, or it is derived from the armature voltage of the generator.

These and other features of the invention, set forth with particularity in the annexed claims, will be apparent from the following description in conjunction with the drawings, in which:

Figure 1 shows the schematic circuit diagram of a first embodiment of the invention including an amplifying generator for normal operation and a standby generator of the conventional exciter type; Fig. 2 shows a circuit diagram of a detail; and, Fig. 3 shows a co-ordinate diagram of explanatory machine characteristics, both referring to the embodiment of Fig. 1. The circuit diagrams of two other embodiments of the invention are represented in Figs. 4 and 5 respectively.

In Fig. 1 the load to be energized is schematically indicated at 1. This load may consist of the field winding of a large turbine-driven alternator whose output voltage is to be kept constant. The load 1 is connected across buses 2 and 3. The contacts 4 and 5 of a circuit breaker B connect the buses 2 and 3 with the armature 6 of an amplifying generator G. This generator has a series field winding 7 and a separately excited regulating field winding 8. A resistor 9 is series connected in the armature circuit to provide, together with field winding 7, a voltage drop proportional to the load current of generator G. In order to secure the desired high ratio of amplification, the series field is preferably tuned to the no-load saturation characteristic of the machine so that the self-excited field winding 7 normally provides all or most of the excitation needed to maintain the generator output at any desired value within the available voltage range, the regulating winding 8 then being called upon only to supply the relatively slight additive or subtractive excitation needed to vary the output voltage from any departure back to the desired magnitude. While the amplifying generator G may have any suitable design, for instance according to the above-mentioned patents, only the elements essential for the present invention are illustrated.

During the normal performance of generator G, with contacts 4 and 5 of breaker B closed, the regulating field winding 8 is connected through the contacts 10 and 11 of a switching device A with the output terminals of a regulator 12. This regulator is inputwise connected across the armature circuit of generator G and supplies the field winding 8 with an error or intelligence voltage whose magnitude and polarity correspond to the magnitude and direction of the departure of the generator voltage from an adjusted desired value. Various regulator circuits capable of providing such a reversible error voltage are known as such. Some of them include a supply of an adjustable constant pattern voltage which is compared with the voltage to be regulated so that the difference of these two voltages, or a voltage proportional to that difference, appears across the regulator output terminals. Another type of suitable regulator circuit involves a normally balanced bridge circuit composed of linear and non-linear impedances. A regulator of the latter type for the purposes of the invention will be described in a later place with reference to Fig. 2.

While during normal operation, with breaker B and switch device A closed, the field winding 8 is controlled to regulate the amplifying generator G for constant voltage, a different control circuit is effective whenever it is desired to modify and depress the external current voltage characteristic of the amplifying generator from its rising normal course. To this end, a switching device C is provided whose contacts 14 and 15, when closed, connect the regulating field winding 8 across the series arrangement of field winding 7 and resistor 9 in series relation to a selectively adjusted portion of a potentiometer rheostat P which is energized from a suitable source of direct-current voltage schematically indicated at 17. This source may consist of a small exciter, a battery, a rectifier circuit connected to an alternating current supply, or, as will be shown in the following, the energization for the rheostat P may be taken from the armature circuit of the amplifying generator itself. While the switching devices A and C, for the sake of simple illustration, are shown as separate units, it should be understood that only one of them is closed at a time so that they may form part of a single reversing or selectively operable switching apparatus. When the switching device C is closed while device A is open, the regulating field winding 8 receives separate excitation of adjusted magnitude from rheostat P. The field winding 8 then has a compounding effect which modifies the normal series machine characteristic toward that of a separately excited or shunt-excited machine; but this effect is also subject to the voltage derived from across the series elements 7 and 9 of the generator armature circuit. This superimposed current-responsive voltage is opposed to the excitation voltage from the rheostat P.

The just-mentioned compounding performance is desired in the illustrated system during periods in which the amplifying generator G is to operate in parallel relation with an exciter machine E of a conventional shunt-excited or separately-excited type, i. e., especially during periods in which the load is to be transferred from the amplifying generator to the exciter E, or vice versa.

The load buses 2 and 3 are connected through the contacts 18 and 19 of a switch D with the armature 21 of the exciter E. In the illustrated example, the field winding 22 of the exciter E is separately excited by selectively adjustable voltage from a potentiometer rheostat 23. This rheostat is connected to a suitable source of constant voltage schematically represented at 24. This voltage source may be identical with the one represented at 17 and mentioned in the foregoing.

Before describing the performance and operating method of the system as a whole, a description of one of the applicable types of regulators for normal excitation of the field regulating winding 8 will be useful.

According to Fig. 2, the regulator 12 may essentially consist of a bridge type network which is excited from the generator output voltage. This voltage is impressed across a potentiometer rheostat 26 and across a parallel connected circuit which includes a non-linear resistance portion in the form of dry type rectifiers 27 and a linear resistance portion in the form of a conventional wire-wound resistor 28. For a given voltage across the bridge circuit, there is a position of the tap point 29 on potentiometer rheostat 26 where the potential across the bridge output points 29 and 30 and hence the voltage across the output terminals 10' and 11' of the regulator 12 is zero. Consequently, when in the embodiment of Fig. 1, the voltage of the amplifying generator G during normal operation has the correct value (A and B closed), no voltage is impressed across the regulating field winding 8 of this generator. As the rheostat point 29 is displaced in the raise direction indicated by the arrow 31 (Fig. 2), a voltage of one polarity appears across the output terminals 10' and 11'. As a result, the regulating field 8 receives excitation of the polarity needed to raise the terminal voltage of the amplifying generator. When the rheostat 26 is adjusted in the opposite direction, a reversed voltage appears across terminals 10' and 11' so that the regulating field winding 8 is excited in the opposite direction in order to lower the terminal voltage of the amplifying generator.

Now, when the rheostat slider 29 is displaced, in the raise direction, a new magnitude of voltage appears across the non-linear or rectifier portion 27 of the circuit as well as across the linear resistance portion 28. A new balance point is thus established at a new level of amplifier terminal voltage. Consequently, when the amplifier output voltage increases due to the change in adjustment, a magnitude of output voltage will be reached where the regulator bridge circuit is again in balance and the voltage impressed on the regulating field winding 8 is again zero or is at whatever small value of current satisfies the amplifying generator at the new level of output voltage.

When the amplifier output voltage is set at a given level and should this voltage tend for any reason to drift, for example to rise, the action on the bridge circuit of the regulator is such as to cause the field current in regulating winding 8 to change in the proper direction to return the amplifying generator voltage to its previous value. This regulating function takes place by reason of the action between the non-linear resistance and the linear resistance in the regulating bridge circuit. In summary, the regulator 12 permits adjusting the output voltage of the amplifying generator to any value within the available range and also provides the reversible error voltage that causes the amplifying generator to automatically maintain the selected output voltage at a constant value.

The problem of paralleling the amplifying generator G with the conventional exciter generator E is essentially the problem of paralleling a machine which has a rising external characteristic with a machine which has the normal drooping characteristic. The above-described regulator or any other regulator of equivalent performance is not suitable for controlling the voltage of an amplifying generator during paralleling because the regulator control will tend to maintain the amplifier output voltage at a fixed, though selected value, regardless of the load on the amplifying machine. The voltage level when the two machines are operating in parallel, however, is not fixed by the amplifier output voltage alone. Therefore, some intelligence is required to keep either machine from taking more than its proper share of the load.

Due to the high amplification obtained with tuned or plural-stage dynamos, it is possible to excite the regulating or control field of such a machine with very little energy so that normal voltage can be obtained at the output terminals at zero load. Under this particular condition, all of the ampere turns necessary to maintain normal full-load voltage can be obtained from the regulating field without any of the self-sustaining ampere turns from the series field. When the amplifying generator begins to pick up load, additional ampere turns are obtained through the series field, and if the proper steps were not taken to control the amplifier output voltage, obviously entirely too much excitation would be obtained when the amplifying dynamo started to pick up load while operating in parallel with a drooping-characteristic generator. Hence a successful paralleling operation can be secured only if it is possible to provide some automatic means which reduces the ampere turns in the regulating field winding of the amplifying machine at about the same rate at which the ampere turns increase the series field of the same machine. This is elucidated by Fig. 3 which shows at N a typical voltage current characteristic of an amplifying generator under normal operation and at M a characteristic of the type required for paralleling such a machine successfully with a conventional drooping-characteristic generator.

The invention achieves such a modification of the external machine characteristic by means of the current responsive feedback circuit with which the regulating field winding 8 is connected when the switching device C is closed. At that time, the field winding 8 receives sufficient constant excitation from across the adjusted portion of rheostat P to raise the external characteristic at no load. At the same time, the excitation of field winding 8 is reduced by the opposingly acting voltage from across series field winding 7 and resistor 9 to make the external characteristic droop toward increasing load currents. As the load increases, the voltage across the resistance in the generator armature circuit reduces the ampere turns in the regulating field winding 8 at approximately the same rate as the ampere turns build up in the series field. By changing slightly the proportion of the current responsive feedback voltage, the amplifying generator can be given any characteristic desired between that of the normal series characteristic and that of a normal direct-current generator with droop necessary for proper parallel operation.

The operation of the system during paralleling performance is as follows.

Assume that breaker B and switch A are closed and that the regulator 12 is maintaining the voltage across the load 1 at the desired constant value by regulating the current in the field winding 8 in the above-explained manner. If now the amplifying generator G is to be substituted by the previously idle exciter generator E, the following steps are to be taken:

1. The voltage output of the regulator 12 is measured across its output terminals. (The measuring point is indicated in Fig. 1 by a voltmeter $V_1$). The potentiometer rheostat P is then adjusted so that the voltage measured across the input terminals of switch C (on the switch side opposite the regulating field winding 8) is equal to the regulator output voltage. (The second measuring point is indicated in Fig. 1 by a voltmeter $V_2$.)

2. When these two voltages are equal, the control field winding 8 is transferred from the regulator 12 to potentiometer and current-responsive excitation by opening switch A and closing switch C in rapid sequence. The amplifying generator G is then in effect operating as an under-compounded generator with series excitation and either self-excited shunt excitation (Fig. 1) or separately excited shunt excitation (Figs. 4, 5).

3. The voltage of the conventional generator E (measured by voltmeter $V_3$ in Fig. 1) is made equal to the amplifying generator or load voltage (measured by voltmeter $V_4$ in Fig. 1).

4. Switch D is closed thus placing the generators in parallel.

5. The load is transferred or divided between the two generators by changing the setting of the potentiometer P or of the generator field rheostat 23.

6. When the load 1 is to be transferred to the generator E and the output current of the amplifying generator is zero, the switching devices B and C are opened (switching device A then being also open) so that the amplifying generator G is deenergized and disconnected, thus imposing the entire load on the exciter generator E.

Assume that the conventional generator E is carrying the load and that the load is to be transferred to the previously idle amplifying generator G. As long as the exciter E is alone in operation, breaker B is open while breaker D is closed. The load voltage is then controlled only by the manually adjusted rheostat 23. The steps necessary for the transfer are the following:

1. Switch C is closed so that the regulating field winding 8 of the amplifying generator G becomes excited.

2. The potentiometer P is adjusted to make the output voltage ($V_4$) of the amplifying generator approximately equal to the load voltage ($V_3$).

3. Breaker B is closed thus connecting the two generators in parallel. As the load current tends to increase in the series field winding 7 of the amplifying generator, the voltage drop across the series field winding 7 and the series resistor 9 opposes the voltage applied to the field winding 8 from the potentiometer rheostat P and thus reduces the resultant regulating field excitation. Thus, any increase in series field current is compensated by a decrease in regulating field current so that an approximately constant flux exists in the amplifying generator. The amount of compensation can be adjusted to provide any desired over-compounded, flat-compounded or under-compounded characteristic for the amplifier G. The most desirable characteristic for parallel operation is under-compounded.

4. Load is divided or transferred by field control as explained previously.

5. When the amplifying generator G is carrying the load and the exciter generator current output is zero, the breaker D is opened.

6. The regulator output voltage ($V_1$) is adjusted to be approximately equal to the control field voltage ($V_2$); and switch A is closed and switch C opened in rapid succession. As a result, the amplifying generator now carries the load under control of the regulator 12.

It has been mentioned that the regulating field winding of the amplifying, rising-characteristic generator, instead of receiving excitation from a separate source may be excited from across the armature circuit of the amplifying generator during paralleling operation. A modification of this kind is illustrated in Fig. 4. It will be understood, however, that various other modifications can readily be made in generator circuits according to the invention. For instance while in the embodiment of Fig. 1 the regulating field winding 8 is provided for normal control and regulating operation as well as for modifying the machine characteristic, separate field windings may be provided for the amplifying generator to operate under normal conditions and during paralleling operation, respectively. This permits giving the regulating field winding a low impedance value for securing a lower time constant more favorable for paralleling performance. A modification of the just-mentioned type is likewise involved in the circuits according to Fig. 4.

In its basic design, the generator circuit shown in Fig. 4 is similar to Fig. 1. For this reason, the elements of Fig. 4 denoted by reference numerals between 1 and 24 are similar to the correspondingly denoted elements respectively of Fig. 1, and the following description of the circuits of Fig. 4 is substantially limited to their differences over those of Fig. 1.

It will be noted that according to Fig. 4 the potentiometer rheostat P for providing an adjustable component voltage for the excitation of the regulating field winding 8 is connected across the armature 6 of the amplifying generator. Consequently, when the switch C is closed (switch A then being open) during paralleling performance, the regulating field winding receives adjusted excitation from across the rheostat P in a manner similar to the shunt field of a self-excited shunt field machine. Of course, in amplifying generators according to the invention, a second component field voltage is simultaneously effective in the regulating field winding 8 in opposition to the voltage from across the rheostat P. This second voltage is taken from across the resistance elements 7 and 9 of the generator armature circuit and has the above-explained effect of counteracting the load responsively increasing ampere turns of the series field winding 7.

According to Fig. 4, the amplifying generator G is equipped with a control field winding 32 which is excited during the normal control and regulating performance of this regulator, i. e., at those times when a modification of the normal rising characteristic is not needed. The load 1 is shown to be the field winding of an alternator 33. The control field winding 32 is connected to the output leads 34 of the alternator through a regulator 35 and a switch F. The regulator 35 may be of any known type suitable to provide an error voltage indicative of any departure of the alternator output voltage from a desired value. The regulator 35 may have a design similar in principle to that of the regulator 12 as described above with reference to Fig. 2, so that a separate pattern voltage need not be supplied. During normal operation of the amplifying generator G, the breaker B and the switch F are closed while breaker D and switches A and C are open. For transferring the load from the amplifying generator to the drooping-characteristic generator E, the switch F is first opened. Immediately thereafter all steps of the paralleling operation described in the foregoing with reference to Fig. 1 are carried out in exactly the same manner. The reverse procedure, i. e., the insertion of the amplifying generator and the transfer of load from the previously active exciter generator are likewise carried out in the manner described with reference to Fig. 1, except that the switch F is closed at the end of the transfer performance.

While a series resistor 9 and a series field winding 7 are shown in Figs. 1 and 4 to jointly provide the voltage drop for the regulating field winding, it will be understood, that any resistance element of the generator armature circuit capable of providing a voltage drop indicative of the load current is suitable for the same purpose. For instance, if the series field winding or part of such a winding has sufficient resistance, the series resistor can be eliminated. On the other hand, if the series field terminals are not accessible or if it is convenient for other reasons, all of the necessary voltage drop can be taken from across a series resistor, providing both a series field winding and a series resistor has the advantage that the ohms in the series field winding permit reducing the size of the required resistor. If an amplifier is used, the voltage drop across a small resistor is sufficient to supply the desired voltage for the regulating field winding.

The system shown in Fig. 5, exemplifies some of the just-mentioned modifications. This system is essentially similar to that of Fig. 4. Reference numerals between 1 and 35 denote elements similar to the respective equally designated elements in Fig. 4. Therefore, it suffices to limit the following description to the differences of the embodiment of Fig. 5 from the circuits described previously.

According to Fig. 5, the amplifying generator G has its separately excited control winding 32 energized through a regulator 35 from the output buses 34 of the alternator 33 under control by a voltage transformer 36 and a group of current transformers 37. The regulator 35 in this embodiment is thus energized by the alternating-current generator potential and by the current through which the positive sequence component of voltage is derived in a manner well known as such. This provides proper intelligence of voltage level to a balanceable bridge circuit made up of non-linear impedance and linear impedance and so arranged that any deviation of the alternator terminal voltage from the level which the regulator 35 is set to hold causes a change in the voltage supplied to the control field winding 32. The regulating generator G is thus caused to raise or lower its output voltage as required to return the alternator voltage to the normal value.

The amplifying generator G is shown in Fig. 5 as being of the plural-stage type according to the above-mentioned patents with four field poles and two pairs of brushes. Forcing field coils and other field windings are connected in two circuits each extending between two brushes of like polarities so that the coil excitation is due to internal circulating currents which flow between the brushes due to an asymmetrical control excitation provided by the control field winding 32 or by the regulating field winding 8 when the latter is in operation. The field windings excited by internal circulating current flowing between equipolar brushes are schematically represented at 38, 39, 40 and 41. Such a machine provides an especially high power output at a high amplification ratio.

According to Fig. 5 the current-responsive feedback excitation imposed on the regulating field winding 8 during the periods in which this winding is in operation is taken exclusively from across a low ohmic series resistor 9. An amplifier 42 is inserted between the resistor and the field circuit of winding 8 in series with the adjusted portion of the potentiometer rheostat P which in other respects is connected and effective in the same manner as the rheostat P of the system shown in Fig. 4. The amplifier 42 may consist of a magnetic amplifier, i. e., of a static type device composed of saturable reactor means with series connected rectifier units.

The performance and operating method of the embodiment shown in Fig. 5 is substantially identical with the performance and paralleling method of the embodiment according to Fig. 4.

It will be obvious to those skilled in the art after a study of this disclosure that the invention permits various modifications other than those specifically disclosed, without departure from the objects and essence of the invention and within the scope of the claims annexed hereto.

We claim as our invention:

1. Electric current generating means, comprising a series-excited generator having a normally rising external characteristic and having an armature circuit and resistance means in said armature circuit, a regulating field winding on said generator, circuit means connected across said resistance means to provide a variable regulating voltage dependent upon the current in said armature circuit, adjustable voltage supply means connected with said circuit means across said field winding, said field winding being poled in opposition to the generator series excitation to modify when effective the external generator characteristic.

2. Electric current generating means, comprising a series-excited generator having a normally rising external characteristic and having an armature circuit, a regulating field winding disposed on said generator and having a field circuit, adjustable voltage supply means connected with said field circuit, current-responsive circuit means connected with said armature circuit to provide a control voltage dependent upon the current in said armature circuit and being connected in said field circuit to impress said voltage thereon, said field winding being poled in opposition to the generator series excitation to modify when effective the external generator characteristic.

3. Electric current generating means, comprising an amplifying generator having an armature circuit and a series field winding in said armature circuit, a regulating field winding on said generator, variable voltage supply means responsive to the current in said armature circuit and connected with said regulating field winding with the polarity needed to make said regulating field winding oppose said series field winding in accordance with said current, and adjustable voltage supply means connected with said regulating field winding in series-opposed relation to said variable voltage supply means.

4. Electric current generating means, comprising an amplifying generator having an armature circuit and a series field winding in said armature circuit, a regulating field winding disposed on said generator and having a field circuit, variable voltage supply means responsive to the current in said armature circuit and connected with said field circuit with the polarity needed to make said regulating field winding oppose said series field winding in accordance with said current, constant-voltage supply means having a potentiometer rheostat, said rheostat having an adjustable portion connected in said field circuit in series opposed relation to said variable-voltage supply means.

5. Electric current generating means, comprising an amplifying generator having an armature circuit and a series field winding in said armature circuit, a regulating field winding disposed on said generator and having a field circuit, variable voltage supply means responsive to the current in said armature circuit and connected with said field circuit with the polarity needed to make said regulating field winding oppose said series field winding in accordance with said current, a potentiometer rheostat connected across said armature circuit and having an adjustable portion connected in said field circuit in series opposed relation to said variable-voltage supply means.

6. Electric current generating means, comprising a series-excited amplifying generator of normally rising characteristic having an armature circuit to provide controllable generator voltage, a regulating field winding disposed on said generator and having a field circuit, adjustable regulator means connected across said armature circuit and having an output voltage indicative of the departure of said generator voltage from a value adjusted by said regulator means, current feedback control means connected with said armature circuit to be impressed by variable voltage according to the current in said armature circuit and having voltage supply means of adjustable voltage so as to provide a control voltage which is the resultant of said variable and adjustable voltages, and selective switch means having contact means connecting said field circuit with said regulator means and with said control means respectively, whereby said regulator means when connected with said field circuit cause said generator to maintain said generator voltage at said value, and said field circuit, when connected with said control means, being poled to oppose the generator series-excitation to depress said characteristic in dependence upon said current.

7. Electric current generating means according to claim 6, said selective switch means having a normal condition in which said contact means are all open and disconnect said field circuit from said regulator means and from said control means, and said generator having a normally operative control field circuit responsive to an electric condition of said armature circuit.

8. Electric current generating means, comprising an amplifying generator having an armature circuit and a series field winding in said armature circuit, a regulating field winding disposed on said generator and having a field circuit, a series resistor in said armature circuit to provide a voltage drop proportional to the current in said armature circuit, an amplifier inputwise connected across said resistor and outputwise connected with said field circuit with the polarity needed to make said regulating field winding oppose said series field winding in accordance with said current, and voltage supply means having an adjustable potentiometer rheostat connected in said field circuit in series relation to said amplifier.

9. Electric current generating means, comprising load buses, a drooping-characteristic generator having a first armature circuit and switch means for connecting said first armature circuit to said buses, a series-excited generator of normally rising characteristic having a second armature circuit and switch means for connecting said second armature circuit to said buses, said switch means being selectively operable to connect either and both armature circuits respectively to said buses, a series resistance means in one of said armature circuits to provide a voltage drop depending upon the current in said one armature circuit, said series-excited generator having a regulating field winding operable when both generators are connected to said buses and opposingly related to the generator series excitation to impart to said series-excited generator a drooping characteristic, and circuit means comprising adjustable-voltage supply means and connecting said regulating field winding with said resistance means for varying the excitation of said regulating field winding in accordance with said voltage drop.

10. Electric current generating means, comprising load buses, a drooping-characteristic generator having switch means selectively connecting said generator to said buses, a series-excited generator of normally rising characteristic having an armature circuit and switch means selectively connecting said armature circuit to said buses, whereby either and both generators are selectively connectible to said buses, said series-excited generator having a regulating field winding operable when both generators are connected to said buses and opposingly related to the generator series excitation to impart to said series-excited generator a drooping characteristic, series resistance means in said armature circuit to provide a voltage drop depending upon the current in said armature circuit, and circuit means connecting said regulating field winding with said resistance means for varying the excitation of said field winding in accordance with said voltage drop.

11. Electric current generating means, comprising load buses, a drooping-characteristic generator having switch means selectively connecting said generator to said buses, a series-excited generator of normally rising characteristic having an armature circuit and switch means selectively connecting said armature circuit to said buses, whereby either and both generators are selectively connectible to said buses, said series-excited generator having regulating field winding means, regulator means responsive to an electric condition of said armature circuit to provide an error voltage indicative of the departure of said condition from a desired value, current feedback control means having resistance means connected in said armature circuit to provide a control voltage variable in accordance with the current in said armature circuit, and selective switch means connecting said winding means with said regulator means and with said control means respectively for selectively controlling said winding means by said error and control voltages respectively, said control means when connected with said winding means having the polarity needed to impart to said series-excited generator a drooping characteristic.

12. Electric current generating means, comprising a series-excited amplifying generator of normally rising characteristic having an armature circuit and series resistance means in said armature circuit, a regulating field winding disposed on said generator and having a field circuit, a source of regulatory error voltages for exciting said field circuit, current feed-back control means connected with said armature circuit to be impressed by variable voltage according to the current in said armature circuit and having voltage supply means of adjustable voltage so as to provide a control voltage which is the resultant of said variable and adjustable voltages, and selective switch means having contact means connecting said field circuit with said source and with said control means respectively, said field circuit, when connected with said control means, being poled to oppose the generator series-excitation to depress said characteristic in dependence upon said current.

13. Electric current generating means, comprising a series-excited amplifying generator having an armature circuit and having series resistance means in said armature circuit, a regulating field winding on said generator, a source of adjustable and substantially constant voltage, and switch means connecting when closed said field winding in series with said source across said resistance means, said field winding when said switch means is closed having a field opposed to the generator series excitation and said resistance means being voltage opposed to said source.

14. Electric current generating means, comprising a series-excited generator having an armature circuit and separately excited field winding means, said armature circuit having series resistance means to provide a voltage drop dependent upon the current in said circuit, said resistance means being connected with said field winding means with the polarity needed to componently excite said field winding means in opposition to the series excitation of the generator, and adjustable voltage supply means connected with said field winding means to componently excite said field winding means in the direction of said series excitation.

15. Electric current generating means, comprising load buses, a drooping-characteristic generator having a first armature circuit and switch means for connecting said first armature circuit to said buses, a series-excited generator of normally rising characteristic having a second armature circuit and switch means for connecting said second armature circuit to said buses, said switch means being selectively operable to connect either and both armature circuits respectively to said buses, a series resistance means in one of said armature circuits to provide a voltage drop depending upon the current in said one armature circuit, said series-excited generator having separately excited field winding means, said resistance means being connected with said field winding means with the polarity needed to componently excite said field winding means in opposition to the series excitation of said series-excited generator, and adjustable voltage supply means connected with said field winding means to componently excite said field winding means in the direction of said series excitation.

DERRILL F. SHANKLE.
JOHN E. BARKLE, JR.

REFERENCES CITED

The following references are of record in the file of this patent:

UNITED STATES PATENTS

| Number | Name | Date |
| --- | --- | --- |
| 1,091,420 | Apple | Mar. 24, 1914 |